United States Patent Office 2,857,413
Patented Oct. 21, 1958

2,857,413

ORGANOTIN COMPOUNDS AND PROCESS OF PREPARATION

Elliott L. Weinberg, New York, N. Y., assignor to Metal & Thermit Corporation, New York, N. Y., a corporation of New Jersey No Drawing. Application March 22, 1954
Serial No. 417,923

19 Claims. (Cl. 260—429.7)

This invention relates to organotin compounds capable of being converted to six-fold coordinated diorganotin anions having particular utility as stabilizing agents for chlorine-containing resins such as polyvinyl chloride and the like, to processes for manufacturing the same, and to stabilized compositions containing said reaction product.

Although six-fold coordinated anions can be readily made from inorganic tin compounds such as the stannate ion and the chlorostannate ion, it has heretofore been impossible to prepare such anions from diorgano-tin halides or other diorganotin compounds such as alkoxides, carboxylates, etc. For example, the six-fold coordinated anion of the chlorostannate ion is readily prepared by reacting $SnCl_4$ with two moles of HCl. By replacing one of the chlorine or halogen atoms in $SnCl_4$ or other tin tetrahalide compound respectively, with a hydrocarbon radical, six-fold coordinated mono-organotin anions such as $H_2.C_2H_5.SnCl_5$, $K_2.C_2H_2.SnF_5$ and the like can be prepared. However, when two of the halogen atoms are replaced by two organic radicals, it has hitherto been impossible to form the diorganotin coordinate compounds therefrom.

In accordance with this invention, the present group of compounds may be generally designated as condensation products of a dihydrocarbon tin oxide with a partially esterified dibasic acid. More particularly, these compounds may be described by the empirical formula:

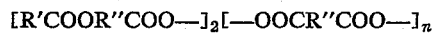

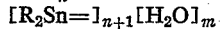

wherein $n$ is an integer from 1–3 and preferably 1 or 2, $m$ is a number less than $n+1$, R is a hydrocarbon radical of at least 2 carbon atoms selected from the group consisting of alkyl, aryl and aralkyl radicals; R' is selected from the group consisting of substituted and unsubstituted alkyl and aryl radicals, and R'' is selected from the group consisting of unsaturated and saturated alkylene and arylene radicals. Thus R' may be derived from any monohydric alcohol capable of being esterified such as dihydroabietyl alcohol, ethyl alcohol, butyl alcohol, lauryl alcohol, octadecyl alcohol, isooctyl alcohol, phenol, benzyl alcohol, etc. Likewise, R'' may be derived from any dibasic acid or anhydride such as phthalic, adipic, and maleic acids, or anhydrides, etc. R may be an ethyl, propyl, butyl, hexyl, phenyl, benzyl, etc. radical.

It is also understood that the final product of a given reaction will ordinarily be a mixture of products, each having the above general formula but differing in the values of $n$ and $m$. For best results, the average value for $n$ in a composition should be about 0.5 to 2.5 and preferably 1 to 2. If $n$ has higher average value than about 2.5, the compositions tend to deposit solid upon standing and to lose some of the desirable properties discussed below.

The products of the present invention may be prepared by reacting a dihydrocarbon tin oxide with a partially esterified dibasic acid under conditions of elevated temperatures and for a sufficent period of time to effect complete reaction therebetween. More specifically, a monohydric alcohol and a dibasic acid or anhydride thereof are first reacted, in the molar ratio of about 1 to 2.5 moles alcohol per mole dibasic acid or anhydride, whereby a monoester of the dibasic acid or a mixture of said monoester with unreacted acid or anhydride are produced; followed by the gradual addition of a dihydrocarbon tin oxide in an amount sufficient to react with all the free acid groups; and elevating the temperature of the mixture to a temperature of about 80° to 160° C. and preferably not to exceed 135° C. until the mixture becomes clear. Upon heating, some water is evolved but the quantity is less than stoichiometric, thereby indicating that some coordination has already occurred.

The physical properties and characteristics of the present reaction products are to some extent dependent on the particular alcohol, dibasic acid and organotin oxide chosen for a particular reaction. Generally, however, these products are stable, viscious, yellow liquids miscible with many organic liquids includng most of the plasticizers commonly used. They are easily blended with the other components of plastic formulations, no grinding or ball milling being required to disperse them. The products are readily compatible with the vinyl resins, thereby resulting in more efficient stabilization of said resins and minimizing sweating, bleeding, etc. Another advantageous property possessed by the composition of the present invention is their non-sticking characteristic during calendering of the vinyl resin. The liquid condition of the present products, their resistance to sweating, etc. and their non-sticking property when calendered render them particularly advantageous as stabilizers for polyvinyl chloride resins and the like. This stabilizing property is equally applicable to rigid plastic formulations and to plasticized compositions.

The reaction products of the present invention possess the following unusual properties not possessed by other organotin products such as dibutyl tin oxide, dibutyl tin dichloride, dibutyl tin dilaurate, dibutyl tin maleate and dibutyl tin-dioctyl phthalate, as evidenced by the following table:

| Product | Behavior With— | |
|---|---|---|
| | HCl | RSH |
| Example 1 | Will take up 5% HCl and form a non-volatile coordinate compound. | Will take up to 35% to form a non-volatile product which does not stain a lead salt. |
| Dibutyl tin oxide | Forms dibutyl tin dichloride which is volatile and noxious. | Forms $R_2Sn$ (SR)$_2$ which will stain a lead salt. |
| Dibutyl tin dichloride | No reaction at room temperature. At elevated temp. forms $Bu\ SnCl_3$ +butane. | Forms $HCl+R_2Sn$ (SR)$_2$ which will stain a lead salt. |
| Dibutyl tin dilaurate | Forms dibutyl tin dichloride and lauric acid. | Forms lauric acid +same. |
| Dibutyl tin maleate | Forms dibutyl tin dichloride and maleic acid. | Forms maleic acid +same. |
| Dibutyl tin oxide dioctyl phthalate. | Forms dibutyl tin dichloride phthalic acid, octyl alcohol. | Forms octyl alcohol. phthalic acid same. |

The above table clearly and unequivocally shows the unique and valuable properties possessed by these reaction products rendering them particularly useful and advantageous as stabilizers for chlorine-containing resins. Firstly, the present products will take up a considerable quantity of HCl without releasing either dibasic acid or monoester of dibasic acid, whereas prior stabilizers such as dibutyl tin dilaurate, dibutyl tin maleate and dibutyl tin-dioctyl phthalate, decomposed releasing dibutyl tin dichloride which is volatile and noxious, and the original acid and/or alcohol reactants. Thus, unusual stability towards HCl exhibited by the present organotin products render them particularly suited as a stabilizer for chlorine-containing resins. Another advantageous property possessed by the present products resides in their ability to react with sulfhydryl compounds to form such stable compounds that the sulfhydryl group is unavailable for reaction with lead salts, often found in resin compositions, thereby avoiding staining of the plastic sheet containing such resin compositions, which has been a usual fault of prior stabilizers. Still another advantage of the present organotin products resides in their ability to react with other organic acids to form distinct coordinate compounds. Thus, it is apparent that the ability of the present reaction products to form six-fold coordinated diorganotin anions has rendered them particularly desirable as stabilizers for resin compositions containing free HCl, sulfhydryl compounds, organic acids and other impurities normally detrimental to the stability, color, etc. of plastic sheets formed therefrom.

The aforesaid organotin reaction products are useful as stabilizers for chlorinated compositions such as chlorine-containing plastics in amounts as low as 0.25% by weight of the resin, said amount being sufficient to stabilize the composition. They additionally may be used as rubber accelerators, rubber antioxidants, polymerization accelerators, and petroleum additives.

In the processing of chlorinated resins, some HCl is evolved which will degrade the resin further and which will contaminate the air. Commonly used products, as above, either do not take up the HCl or do so with the formation of the somewhat less volatile but more obnoxious dibutyl tin dichloride, with or without the release of other materials such as lauric acid, maleic acid or phthalic acid which will exude and ruin the finished surface. Similarly, it is desirable to use R'SH compounds for antioxidant purposes but these products alone will cause stains if they come into contact with lead salts. The product of this invention overcomes these disadvantages by converting the undesirable action to one of forming relatively inert, stable, hexacovalent organotin anions of the general structure:

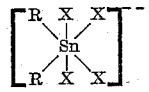

The following examples are further illustrative of these reaction products of diorganotin oxide and partially esterified dibasic acids and their preparation, and it will be understood that the invention is not limited thereto:

Example I 26.0 gms. isooctyl alcohol and 29.4 gms. maleic anhydride were placed in a reactor wherein the anhydride melted and agitation was started. 49.8 gm. dibutyl tin oxide was gradually added thereto. Heating was controlled so as not to exceed 135° C. After all the oxide had dissolved, the temperature was raised to 135° C. at which temperature the liquid was filtered. The resultant filtrate, upon cooling, was a slightly viscous yellow liquid, which remained liquid upon storing and had the following formula:

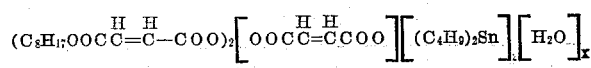

Example II 26.0 gms. isooctyl alcohol, 58.8 gms. maleic anhydride and 124.5 gms. dibutyl tin oxide were treated in accordance with Example I. The product was liquid but became solid upon storing, because $n$ in the aforesaid formula equals 4.

Example III 26.0 gms. isooctyl alcohol, 39.2 gms. maleic anhydride and 75.0 gms. dibutyl tin oxide were treated in accordance with Example I. This material remained liquid upon storing.

Example IV

Two moles of "Abitol" (85% dihydroabietyl alcohol), three moles of dibutyl tin oxide and four moles of maleic anhydride were treated in accordance with Example I. The resultant product was a translucent, very viscous material.

Example V

As in Example IV but octadecyl alcohol replaced the "Abitol." The product became a low-melting, waxy solid after standing for a few days.

Example VI

As in Example IV, but lauryl alcohol replaced the "Abitol." The product was a yellow, translucent liquid.

Example VII

Two moles of isooctyl alcohol, three moles of dibutyl tin oxide and four moles of phthalic anhydride were treated as in Example I. The final temperature in this instance was 155° C. The product was a tan, waxy solid.

Example VIII

As in Example VII but succinic anhydride replaced the phthalic anhydride. The product was a white, waxy solid.

Example IX

As in Example VIII but adipic anhydride replaced the phthalic anhydride. The final temperature was 135° C. The product was a white, waxy solid.

Example X

Two moles of isooctyl alcohol, three moles of diphenyl tin oxide and four moles of maleic anhydride were treated as in Example V. The product was a yellow, viscous liquid.

It has also been discovered and is a feature of this invention that the reaction products of organotin oxide and partially esterified dibasic acid of this invention function as excellent stabilizers for resin compositions, particularly resin compositions containing vinyl chloride and plasticizers, and when intimately dispersed therein, will provide plastic compositions of improved resistance to heat deterioration. Stable thermoplastic compositions containing copolymers and vinylidene dichloride polymers are also obtainable with the use of the present organotin derivatives. Excellent films are obtained from the aforesaid plastic compositions which exhibit a high degree of stability. The optimum concentration of the aforesaid organotin derivatives, useful as a stabilizer is about 0.5–10% based on the weight of the vinyl resin. The resin composition containing this concentration of stabilizer produces a stable plastic film which does not darken at elevated temperatures.

The stabilizers of this invention were tested in the following formulation:

100 pts. of Geon 101-vinyl chloride resin
50 pts. of DOP-dioctyl phthalate
1 pt. of stabilizer The composition was mixed and then milled for five minutes at 320° C. Strips (1" x 6") of the milled sheet (40 mil thickness) were then placed in a circulating oven at 350° F. Samples were taken at 15 minute intervals over a period of one hour. In all cases, the one hour sample was only slightly yellow or tan in contrast to the black of an unstabilized composition.

While the invention has been described with reference to various examples and embodiments, it will be apparent to those skilled in the art that various modifications may be made and equivalents substituted therefor, without departing from the principles and true nature of the present invention.

What is claimed by Letters Patent is:

1. A method which comprises reacting a hydroxy compound of formula R'OH and a dibasic acid compound selected from the group consisting of dibasic acids of formula HOOCR"COOH and their anhydrides to form an ester reaction mixture containing unesterified dibasic acid compound, and reacting said ester reaction mixture with a hydrocarbontin oxide of formula $R_2SnO$, wherein R is a monovalent hydrocarbon radical of at least 2 carbon atoms selected from the class consisting of alkyl, aryl hydrocarbon, and aralkyl hydrocarbon radicals; R' is a monovalent hydrocarbon radical selected from the class consisting of alkyl, cycloaliphatic hydrocarbon, aryl hydrocarbon and aralkyl hydrocarbon; and R" is a divalent hydrocarbon radical selected from the class consisting of lower alkylene, ethylenic unsaturated aliphatic hydrocarbon radicals and aromatic hydrocarbon radicals.

2. A method which comprises reacting a monohydroxy compound of the formula R'OH and a dibasic acid compound selected from the class consisting of dibasic acids of the formula HOOCR"COOH and their anhydrides to form an ester reaction mixture containing unesterified dibasic acid compound, gradually adding to the reaction mixture so formed a dihydrocarbontin oxide of the formula $R_2SnO$ in sufficient amount to react with all of the free acid groups, and heating the mixture so formed until the reaction mixture clears, wherein R is a monovalent hydrocarbon radical of at least 2 carbon atoms selected from the class consisting of alkyl, aryl hydrocarbon and aralkyl hydrocarbon radicals, R' is a monovalent hydrocarbon radical selected from the class consisting of alkyl, cycloaliphatic hydrocarbon, aryl hydrocarbon and aralkyl hydrocarbon radicals, and R" is a divalent hydrocarbon radical selected from the class consisting of lower alkylene, ethylenic unsaturated aliphatic hydrocarbon radicals and aromatic hydrocarbon radicals.

3. A method according to claim 2 wherein said heating is effected at temperatures between 80° and 160° C.

4. A method according to claim 2, wherein said heating is effected at temperatures between 80° and 135° C.

5. A method according to claim 1, wherein R is alkyl, R' is alkyl and R" is a divalent ethylenic unsaturated hydrocarbon radical.

6. A method according to claim 1, wherein R is alkyl, R' is alkyl, and R" is a divalent lower alkylene radical.

7. A method according to claim 1, wherein R is aryl, R' is alkyl and R" is a divalent ethylenic unsaturated aliphatic hydrocarbon radical.

8. A method which comprises reacting two moles of isooctyl alcohol with three moles of a compound selected from the class consisting of maleic acid and maleic anhydride to form a reaction mixture containing unesterified maleic acid, and reacting said ester reaction mixture with two moles of dibutyltin oxide.

9. A method which comprises heating a mixture of isooctyl alcohol and maleic anhydride, adding thereto dibutyltin oxide and heating the resulting mixture to complete the reaction, said isooctyl alcohol, maleic anhydride and dibutyltin oxide being employed in the molar ratio of about 2:3:2.

10. A method which comprises reacting two moles of issooctyl alcohol with four moles of a compound selected from the class consisting of maleic acid and maleic anhydride to form a reaction mixture containing unesterified maleic acid, and reacting said ester reaction mixture with three moles of dibutyltin oxide.

11. A method which comprises heating a mixture of isooctyl alcohol and maleic anhydride, adding thereto dibutyltin oxide and heating the resulting mixture to complete the reaction, said issoctyl alcohol, maleic anhydride and dibutyltin oxide being employed in the molar ratio of about 2:4:3.

12. A product made by the process of claim 1.
13. A product made by the process of claim 5.
14. A product made by the process of claim 6.
15. A product made by the process of claim 7.
16. A product made by the process of claim 8.
17. A product made by the process of claim 9.
18. A product made by the process of claim 10.
19. A product made by the process of claim 11.

References Cited in the file of this patent

UNITED STATES PATENTS

| | | |
|---|---|---|
| 2,604,483 | Mack et al. | July 22, 1952 |
| 2,641,588 | Leistner et al. | June 9, 1953 |
| 2,643,242 | Churchhill | June 23, 1953 |
| 2,665,286 | Passino et al. | Jan. 5, 1954 |
| 2,684,973 | Mack et al. | July 27, 1954 |